(12) United States Patent
Hiramatsu et al.

(10) Patent No.: US 12,081,084 B2
(45) Date of Patent: *Sep. 3, 2024

(54) MANUFACTURING METHOD FOR MOTOR CORE

(71) Applicant: AISIN CORPORATION, Aichi (JP)

(72) Inventors: Tomoko Hiramatsu, Kariya (JP); Akinori Hoshino, Kariya (JP)

(73) Assignee: AISIN CORPORATION, Kariya (JP)

( * ) Notice: Subject to any disclaimer, the term of this patent is extended or adjusted under 35 U.S.C. 154(b) by 442 days.

This patent is subject to a terminal disclaimer.

(21) Appl. No.: 17/430,975

(22) PCT Filed: Mar. 26, 2020

(86) PCT No.: PCT/JP2020/013724
§ 371 (c)(1),
(2) Date: Aug. 13, 2021

(87) PCT Pub. No.: WO2020/196768
PCT Pub. Date: Oct. 1, 2020

(65) Prior Publication Data
US 2022/0140708 A1 May 5, 2022

(30) Foreign Application Priority Data
Mar. 28, 2019 (JP) ................................. 2019-062103

(51) Int. Cl.
*H02K 15/03* (2006.01)
*H01F 41/00* (2006.01)
(Continued)

(52) U.S. Cl.
CPC ........... *H02K 15/03* (2013.01); *H01F 41/005* (2013.01); *H01F 41/0206* (2013.01); *H01F 41/0233* (2013.01); *H02K 1/278* (2013.01)

(58) Field of Classification Search
CPC ...... H02K 15/03; H02K 1/278; H02K 1/2766; H01F 41/005; H01F 41/0206; H01F 41/0233
See application file for complete search history.

(56) References Cited

U.S. PATENT DOCUMENTS

2012/0325552 A1 12/2012 Sakura
2014/0196276 A1* 7/2014 Nagai .................... H02K 15/03
29/598
(Continued)

FOREIGN PATENT DOCUMENTS

JP 2004-260881 A 9/2004
JP 2007-282392 A 10/2007
(Continued)

OTHER PUBLICATIONS

Jun. 16, 2020 International Search Report issued in International Patent Application No. PCT/JP2020/013724.
(Continued)

*Primary Examiner* — S. Behrooz Ghorishi
(74) *Attorney, Agent, or Firm* — Oliff PLC

(57) ABSTRACT

A manufacturing method for a motor core in which a magnet is fixed in a magnet accommodating portion using synthetic resin material includes: a fixing step of fixing the a permanent magnet in the a magnet accommodating portion using a synthetic resin material, wherein the fixing step includes: an injection step of setting a temperature of the synthetic resin material to a first temperature and injecting, with an injection device having a container capable of maintaining the synthetic resin material in the softened state, the softened synthetic resin material into the magnet accommodating portion; and a curing step of raising the temperature of the synthetic resin material injected into the stacked body to a second temperature to cure the synthetic resin material, with
(Continued)

the injection device being moved away from the stacked body.

11 Claims, 13 Drawing Sheets

(51) Int. Cl.
*H01F 41/02* (2006.01)
*H02K 1/278* (2022.01)

(56) References Cited

U.S. PATENT DOCUMENTS

| | | | |
|---|---|---|---|
| 2016/0181896 A1 | 6/2016 | Masubuchi et al. | |
| 2021/0194338 A1 | 6/2021 | Ikeda et al. | |
| 2021/0234440 A1 | 7/2021 | Murayama et al. | |
| 2021/0242756 A1 | 8/2021 | Ikeda et al. | |

FOREIGN PATENT DOCUMENTS

| | | | |
|---|---|---|---|
| JP | 2008-245405 A | | 10/2008 |
| JP | 4414417 B2 | | 2/2010 |
| JP | 4848040 B2 | | 12/2011 |
| JP | 2012228032 A | * | 11/2012 |
| JP | 2013-162640 A | | 8/2013 |
| JP | 5357217 B2 | | 12/2013 |
| JP | 5373269 B2 | | 12/2013 |
| JP | 2014-138533 A | | 7/2014 |
| JP | 2016-123227 A | | 7/2016 |
| JP | 6180569 B2 | | 8/2017 |
| JP | 6533635 B1 | | 6/2019 |

OTHER PUBLICATIONS

Dec. 1, 2020 International Search Report issued in International Patent Application No. PCT/JP2020/035757.

U.S. Appl. No. 17/625,038, filed Jan. 5, 2022 in the name of Tomoko Hiramatsu et al.

Apr. 21, 2022 Extended Search Report issued in European Patent Application No. 20778096.6.

* cited by examiner

US 12,081,084 B2

MANUFACTURING METHOD FOR MOTOR CORE

TECHNICAL FIELD

The present disclosure relates to a manufacturing method for a motor core. The present disclosure especially relates to a method including forming a stacked body that is formed by stacking a plurality of thin plates (steel plates) and that includes a magnet accommodating portion extending in a stacking direction, inserting a permanent magnet into the magnet accommodating portion, and fixing (sealing) the permanent magnet to the stacked body (in the magnet accommodating portion).

BACKGROUND ART

For example, as described in Patent Document 1 below, a method of fixing (sealing) a permanent magnet inserted in a magnet accommodating portion of a stacked body to the stacked body using a thermoplastic resin material is known. Also, as described in Patent Documents 2 and 3, a method of fixing (sealing) a permanent magnet inserted in a magnet accommodating portion of a stacked body to the stacked body using a thermosetting resin material is known.

RELATED ART DOCUMENTS

Patent Documents

Patent Document 1: Japanese Unexamined Patent Application Publication No. 2008-245405 (JP 2008-245405 A)
Patent Document 2: Japanese Patent No. 5357217 (JP 5357217 B)
Patent Document 3: Japanese Patent No. 4414417 (JP 4414417 B)

SUMMARY OF THE DISCLOSURE

In the case where the method of Patent Document 1 is used, the thermoplastic resin material that has been heated and softened is cooled and begins to cure when it is injected into the magnet accommodating portion from the injection device and spreads in the magnet accommodating portion. Accordingly, it is necessary to set the injection pressure of the thermoplastic resin material to be relatively high, charge the thermoplastic resin material into the hole of the magnet accommodating portion in the shortest time possible, and further, maintain the pressure until the thermoplastic resin material is cured in order to restrain the thermoplastic resin material from flowing back. Thus, the injection device cannot be retracted from the stacked body until the thermoplastic resin material is cured in the magnet accommodating portion. In other words, the injection device is occupied from the start of injection of the thermoplastic resin material to the end of curing. Therefore, the efficiency in production of the motor core is low.

As described above, the injection pressure and the pressure maintaining force of the thermoplastic resin material are relatively high. Thus, if the wall thickness of a portion of the stacked body that constitutes the peripheral edge portion of the magnet accommodating portion is relatively small, the peripheral edge portion may deform during the injection process or the curing process of the thermoplastic resin material.

When the method of Patent Document 2 or Patent Document 3 is used, the thermosetting resin material that has been heated and softened is injected from the injection device into the magnet accommodating portion. Here, in general, the thermosetting resin material is a solid (tablet) in a state before use, and curing reaction starts immediately after being heated and once softened. Therefore, it is necessary to maintain the injection pressure and the pressure maintaining force of the thermosetting resin material relatively high as in the case of using the thermoplastic resin material. Thus, the same issue as in the case of using the method of Patent Document 1 arises.

Further, due to the manufacturing accuracy (dimensional accuracy in the plate thickness direction, flatness, and the like) of each thin plate (steel plate), the height dimension (dimension in the stacking direction of the plurality of thin plates) slightly differs for each stacked body. That is, the volume of the magnet accommodating portion slightly differs for each stacked body. Therefore, even when the volume of the magnet accommodating portion is relatively large, the thermosetting resin material (tablet) in a slightly larger amount than the assumed volume (maximum volume) of the magnet accommodating portion is used so that the magnet accommodating portion can be filled with thermosetting resin material. That is, the thermosetting resin material is used in such an amount that the thermosetting resin material slightly overflows from the magnet accommodating portion when being softened. The thermosetting resin material that overflows from the magnet accommodating portion remains in the injection device. That is, the thermosetting resin material cures in the injection device. Thus, it is necessary to remove synthetic resin material cured in the injection device after fixing of the permanent magnet to the stacked body is completed.

The present disclosure has been made to address the above issues, and an object of the present disclosure is to provide a manufacturing method for a motor core that can improve the efficiency in production of a motor core. In the following description of the components of the present disclosure, the reference signs of the parts corresponding to those of the embodiments are indicated in parentheses, in order to facilitate understanding of the present disclosure. However, the components of the present disclosure should not be construed as being limited to the configuration of the corresponding parts indicated by the reference signs of the embodiments.

In order to achieve the above object, a manufacturing method for a motor core according to the present disclosure includes: a stacked body manufacturing step of stacking a plurality of steel plates to manufacture a stacked body having a magnet accommodating portion extending in a stacking direction of the steel plates; a magnet disposing step of disposing a permanent magnet extending in the stacking direction of the plurality of steel plates in the magnet accommodating portion; and a fixing step of fixing the permanent magnet in the magnet accommodating portion using a synthetic resin material that is in a softened state at a first temperature and is cured at a second temperature that is higher than the first temperature, wherein the fixing step includes: an injection step of setting a temperature of the synthetic resin material to the first temperature and injecting, with an injection device having a container capable of maintaining the synthetic resin material in the softened state, the softened synthetic resin material into the magnet accommodating portion; and a curing step of raising the temperature of the synthetic resin material injected into the stacked body to the second temperature to cure the synthetic resin material, with the injection device being moved away from the stacked body.

The curing step according to one aspect of the present disclosure includes a step of moving the injection device away from the stacked body, transferring the stacked body to a heating furnace or an induction heating device at a location different from the injection device, and raising the temperature of the synthetic resin material injected into the stacked body to the second temperature with the heating furnace or the induction heating device so as to cure the synthetic resin material.

Further, a manufacturing method for a motor core according to another aspect of the present disclosure includes: a stacked body manufacturing step of stacking a plurality of steel plates to manufacture a stacked body having a magnet accommodating portion extending in a stacking direction of the steel plates; a magnet disposing step of disposing a permanent magnet extending in the stacking direction of the plurality of steel plates in the magnet accommodating portion; and a fixing step of fixing the permanent magnet in the magnet accommodating portion using a synthetic resin material that is in a softened state at a first temperature and is cured at a second temperature that is higher than the first temperature, wherein the fixing step includes: an injection step of setting a temperature of the synthetic resin material to the first temperature and injecting, with an injection device having a container capable of maintaining the synthetic resin material in the softened state, the softened synthetic resin material into the magnet accommodating portion; and a curing step of transferring the stacked body to a heating furnace or an induction heating device at a location different from the injection device and raising the temperature of the synthetic resin material injected into the stacked body to the second temperature with the heating furnace or the induction heating device so as to cure the synthetic resin material.

In one aspect of the present disclosure, the injection device has a heating device and maintains the synthetic resin material at the first temperature.

In another aspect of the present disclosure, the injection device includes a drive device for discharging the synthetic resin material from the container; and in the injection step, after the magnet accommodating portion is filled with the softened synthetic resin material, a drive direction of the drive device of the injection device is reversed, and then the injection device is moved away from the stacked body.

As described above, the synthetic resin material adopted in the present disclosure does not cure when its temperature is maintained at the first temperature, but cures when the temperature reaches the second temperature that is higher than the first temperature. Therefore, even if the synthetic resin material is injected into the magnet accommodating portion, the synthetic resin material in this state is not cured in the magnet accommodating portion. Thus, unlike the cases where the manufacturing methods for a motor core of Patent Documents 1 to 3 are used, the injection pressure of the synthetic resin material can be set to be relatively low. Further, it is not necessary to maintain the pressure to restrain the backflow of the synthetic resin material. Thus, it is possible to perform the curing step of releasing the injection device immediately after filling all the magnet accommodating portions with the synthetic resin material, transferring the stacked body to another place (downstream side of the production line), and curing the synthetic resin material by heating at that location. That is, according to the present disclosure, when the filling of the synthetic resin material for one stacked body is completed, it is possible to immediately release the injection device without waiting for the completion of curing of the synthetic resin material and start the filling work of the synthetic resin material for the next stacked body.

In the fixing step according to one aspect of the present disclosure, prior to the injection step, the stacked body is heated such that the temperature of the stacked body is higher than the first temperature and lower than the second temperature; and in the injection step, the stacked body, into which the softened synthetic resin material is injected with a nozzle of the injection device being contact with an open end of the magnet accommodating portion of the stacked body, is heated such that the temperature of the stacked body is higher than the first temperature and lower than the second temperature.

This enables the synthetic resin material to be maintained in a molten state in the injection step, because the temperature of the stacked body is higher than the melting temperature of the synthetic resin material. Further, since the temperature of the stacked body is lower than the curing temperature of the synthetic resin material, curing of the synthetic resin material can be suppressed. That is, in the injection step, the synthetic resin material can be maintained in a good state of fluidity.

In the injection step according to one aspect of the present disclosure, when an injection pressure of the synthetic resin material becomes higher than a predetermined pressure, injection of the synthetic resin material into a through hole of the stacked body is stopped.

With this, the synthetic resin material in substantially the same amount (necessary and sufficient amount for filling the space) as the volume of the space (gap) in each magnet accommodating portion can be injected into each magnet accommodating portion from the injection device. After the magnet accommodating portion is filled with the synthetic resin material, the stacked body is heated to cure the synthetic resin material, but in the curing step, the injection device has been released (moved away) from the stacked body. Therefore, the heat of the stacked body heated in the curing step is not transferred to the injection device. Thus, unlike the cases where the manufacturing methods of Patent Documents 2 and 3 are used, a situation where the synthetic resin material is cured does not occur in the container and the injection device. Accordingly, the work of removing the synthetic resin material from the injection device is unnecessary.

As described above, according to the present disclosure, the efficiency in production of the motor core can be improved.

Further, a manufacturing method for a motor core according to another aspect of the present disclosure includes: a stacked body manufacturing step of stacking a plurality of steel plates to manufacture a stacked body having a magnet accommodating portion extending in a stacking direction of the steel plates; a magnet disposing step of disposing a permanent magnet extending in the stacking direction of the plurality of steel plates in the magnet accommodating portion; and a fixing step of fixing the permanent magnet in the magnet accommodating portion using a synthetic resin material that is in a solid state at normal temperature, is in a softened state at a first temperature that is higher than the normal temperature, and is cured at a second temperature that is higher than the first temperature, wherein the fixing step includes: an injection step of raising a temperature of the synthetic resin material from the normal temperature to the first temperature to soften the synthetic resin material and injecting the softened synthetic resin material into the magnet accommodating portion; and a curing step of raising the temperature of the synthetic resin material injected into the stacked body to the second temperature to cure the synthetic resin material.

The injection step according to another aspect of the present disclosure includes a step of charging the synthetic resin material in the solid state into the injection device, raising the temperature of the charged synthetic resin material to the first temperature to soften the synthetic resin material, and injecting the softened synthetic resin material into the magnet accommodating portion.

Here, Patent Documents 2 and 3 each disclose a method of fixing a permanent magnet in a magnet accommodating portion by using a thermosetting synthetic resin material. However, this thermosetting synthetic resin material is in a solid state (flakes) before use, and curing reaction starts immediately after the thermosetting synthetic resin material is heated and once softened. Thus, there is a possibility that the thermosetting synthetic resin material is cured with the magnet accommodating portion being incompletely filled with the softened thermosetting synthetic resin material and sufficient fixing strength of the permanent magnet cannot be obtained. In contrast, the thermosetting synthetic resin material used in the present disclosure is heated from normal temperature (before use), and softens when the temperature thereof reaches the first temperature. The thermosetting synthetic resin material remains softened until the temperature reaches the second temperature that is higher than the first temperature. Thus, the softened thermosetting synthetic resin material can be relatively easily charged into the magnet accommodating portion, and sufficient fixing strength of the permanent magnet can be obtained. Further, the thermosetting resin material can be held in a softened state in the injection device, and a surplus in the production of one motor core can be used in the production of the next motor core.

MODES FOR CARRYING OUT THE DISCLOSURE

Figure 1:
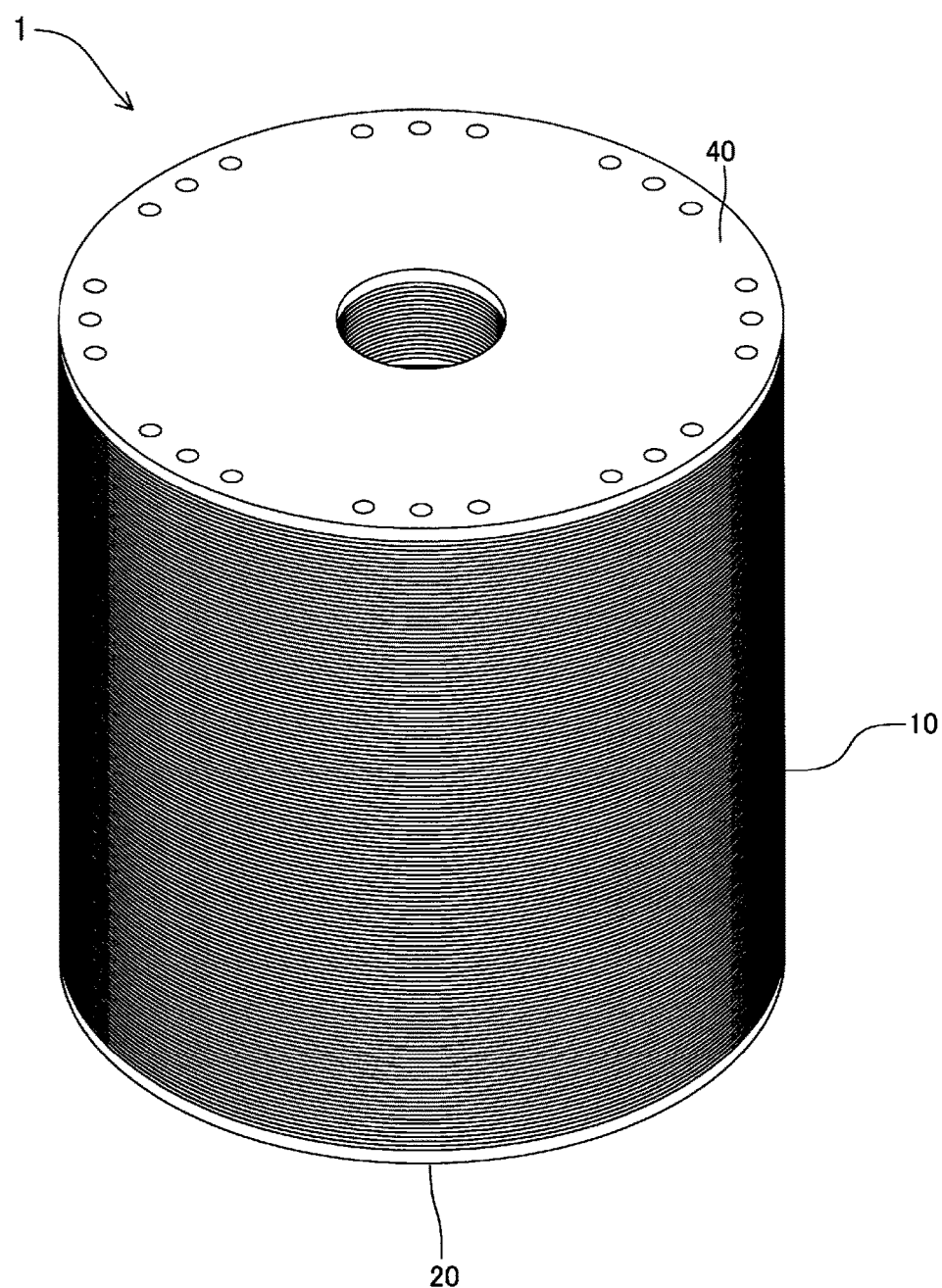
FIG. 1 is a perspective view of a rotor core manufactured by using a manufacturing method according to an embodiment of the present disclosure.

Hereinafter, a procedure for manufacturing a rotor core 1 shown in FIGS. 1 and 2 using a manufacturing method for a motor core according to an embodiment of the present disclosure will be described. The rotor core 1 is applied to a well-known rotor of an IPM motor. The rotor core 1 includes a stacked body 10, an end plate 20, a plurality of permanent magnets 30, and an end plate 40.

(Stacked Body Manufacturing Step)

Figure 3:
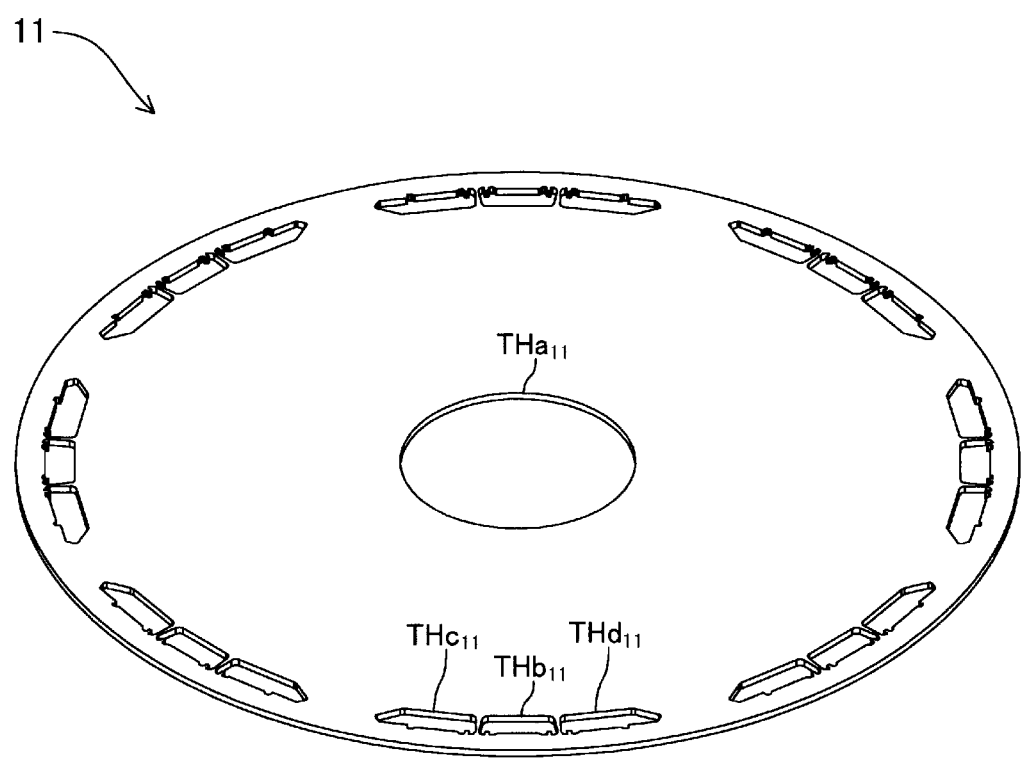
FIG. 3 is a perspective view of an iron core piece.
Figure 4A:
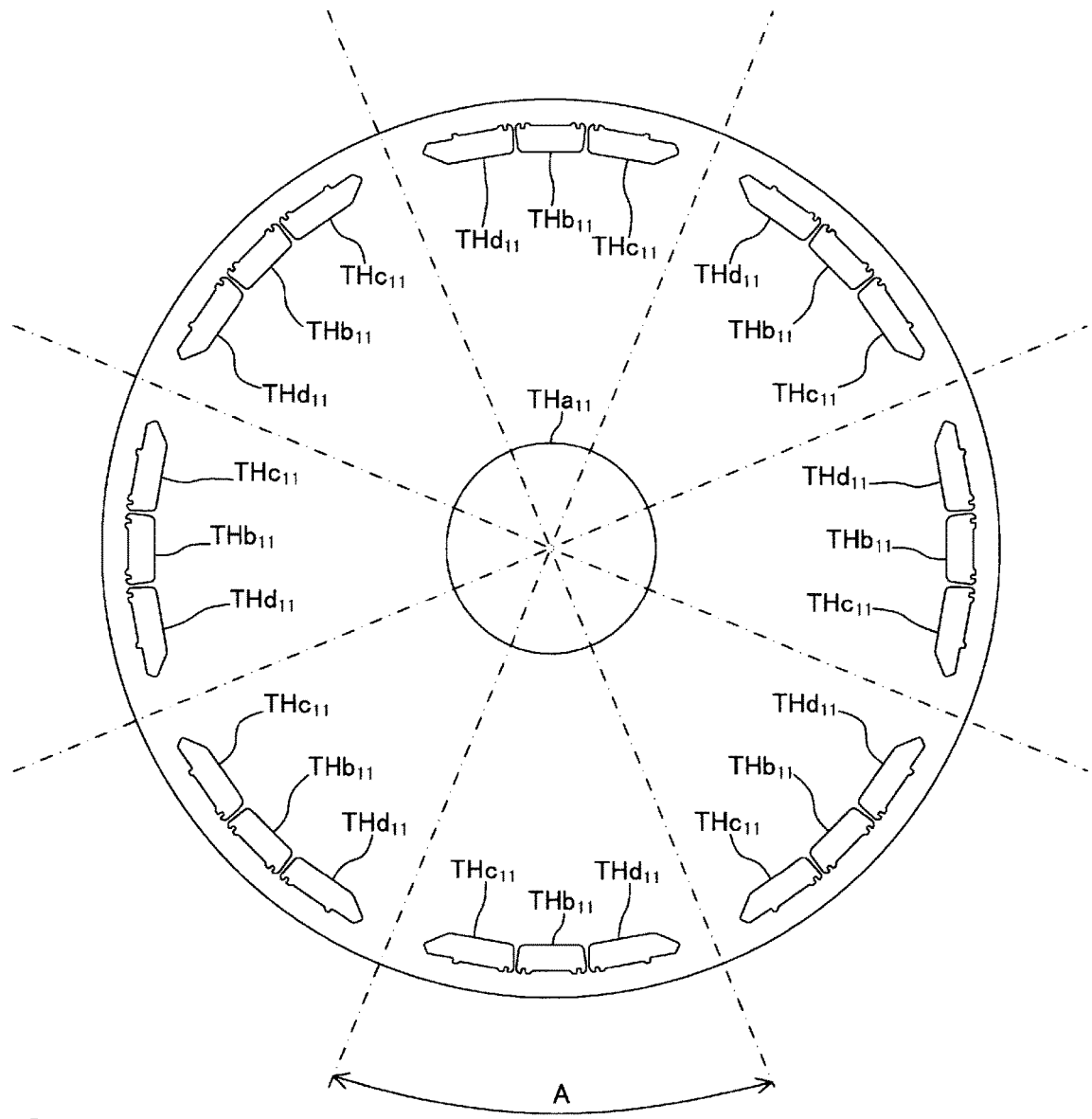
FIG. 4A is a plan view of the iron core piece.
Figure 4B:
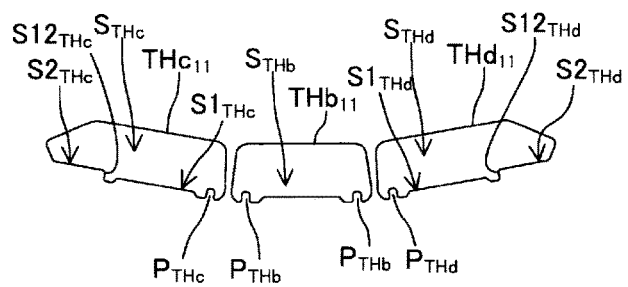
FIG. 4B is an enlarged view of a part of an outer peripheral edge portion of the iron core piece.

The stacked body 10 is formed by stacking iron core pieces 11 (see FIG. 3 and FIG. 4A and 4B) each made of a silicon steel plate. The iron core piece 11 is formed by punching a base material. A circular through hole $THa_{11}$ is provided in the central portion of the iron core piece 11. Through holes $THb_{11}$, $THc_{11}$, $THd_{11}$ are provided in an outer peripheral edge portion of each of regions A obtained by dividing the iron core piece 11 into eight equal parts in the circumferential direction. The through holes $THb_{11}$, $THc_{11}$, $THd_{11}$ are adjacent to each other in the circumferential direction of the iron core piece 11. The through hole $THb_{11}$ is disposed between the through hole $THc_{11}$ and the through hole $THd_{11}$. The through hole $THb_{11}$ has a substantially rectangular (isosceles trapezoid) shape extending in a direction perpendicular to the radial direction of the iron core piece 11 and perpendicular to the plate thickness direction. The through holes $THc_{11}$, $THd_{11}$ each have a substantially pentagonal shape extending in a direction perpendicular to the radial direction of the iron core piece 11 and perpendicular to the plate thickness direction.

Of the sides of the through hole $THb_{11}$, the side $S_{THb}$ on the outer peripheral side of the iron core piece 11 is provided with a pair of protruding portions $P_{THb}$, $P_{THb}$ protruding toward the inner peripheral side. The protruding portions $P_{THb}$ are formed at end portions of the side $S_{THb}$ in the extending direction. The sides of the through holes $THc_{11}$, $THd_{11}$ include sides $S_{THc}$, $S_{THd}$ on the outer peripheral side of the iron core piece 11. Portions $S1_{THc}$, $S1_{THd}$ of the sides $S_{THc}$, $S_{THd}$ at respective one end portion sides in the extending direction, which are positioned on the sides toward the through hole $THb_{11}$, are positioned further outward in the radial direction of the iron core piece 11 than portions $S2_{THc}$, $S2_{THd}$ on the sides away from the through hole $THb_{11}$. That is, in a plan view of the iron core piece 11, a step is formed at a boundary portion $S12_{THc}$ between the portion $S1_{THc}$ and the portion $S2_{THc}$ and a boundary portion $S12_{THd}$ between the portion $S1_{THd}$ and the portion $S2_{THd}$. Protruding portions $P_{THc}$, $P_{THd}$ protruding toward the inner peripheral side are formed at the portions $S1_{THc}$, $S1_{THd}$, respectively. The protruding portions $P_{THc}$, $P_{THd}$ are formed at end portions of the portions $S1_{THc}$, $S1_{THd}$ in the extending direction, which are end portions on the through hole $THb_{11}$ side.

A plurality of the iron core pieces 11 are stacked such that the through holes $THa_{11}$ of the iron core pieces 11 are coaxially arranged and the through holes $THb_{11}$, $THc_{11}$, $THd_{11}$ of the iron core pieces 11 are respectively arranged coaxially. The iron core pieces 11 are crimped together. In the stacked body 10, the respective through holes $THa_{11}$ and the respective through holes $THb_{11}$, $THc_{11}$, $THd_{11}$ of the iron core pieces 11 communicate with each other in a direction parallel to the extending direction of a central axis C of the stacked body 10 (stacking direction of the iron core pieces 11) (see FIG. 1). In other words, the stacked body 10 has a through hole $THa_{10}$ (a portion where the through holes $THa_{11}$ of the iron core pieces 11 communicate with each other) that is disposed coaxially with the central axis C. Further, the stacked body 10 has, at the outer peripheral edge portion thereof, a plurality of magnet accommodating portions $MHb_{10}$, $MHc_{10}$, $MHd_{10}$ (portions where the through holes $THb_{11}$, $THc_{11}$, $THd_{11}$ of the iron core pieces 11 communicate) extending in parallel with the central axis C. The magnet accommodating portion $MHb_{10}$ has protrusions $P_{MHb}$, $P_{MHb}$ formed by overlapping the protruding portions $P_{THb}$, $P_{THb}$ (see FIG. 5). The magnet accommodating portions $MHc_{10}$, $MHd_{10}$ have protrusions $P_{MHc}$, $P_{MHd}$ formed by overlapping the protruding portions $P_{THc}$, $P_{THd}$, respectively. Further, the magnet accommodating portions $MHc_{10}$, $MHd_{10}$ have wall surfaces $S12_{MHc}$, $S12_{MHd}$ formed by overlapping the boundary portions $S12_{THc}$, $S12_{THd}$.

Figure 5:
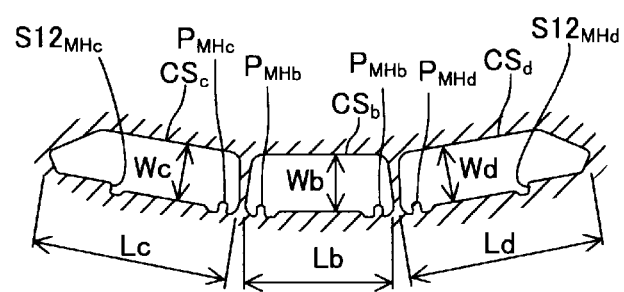
FIG. 5 is a cross-sectional view perpendicular to the longitudinal direction (depth direction) of magnet accommodating portions.

Widths Wb, Wc, Wd of cross sections $CS_b$, $CS_c$, $CS_d$ perpendicular to the extending direction of the magnet accommodating portions $MHb_{10}$, $MHc_{10}$, $MHd_{10}$ (stacking direction of the iron core pieces 11) are substantially the same (see FIG. 5). Lengths Lc, Ld of the stacked body 10 in the cross sections $CS_c$, $CS_d$ are larger than a length Lb of the cross section $CS_b$.

(First End Plate Attachment Step)

The end plate 20 (see FIG. 2) is attached to one end surface (lower surface) of the stacked body 10 configured as described above in the extending direction of the central axis C. The end plate 20 is made from synthetic resin. The end plate 20 is a plate-shaped member having substantially the same shape as the iron core piece 11. The plate thickness of the end plate 20 is slightly larger than the plate thickness of the iron core piece 11. The end plate 20 has a circular through hole $THa_{20}$ having substantially the same diameter as the through hole $THa_{10}$ of the stacked body 10, but does not have through holes corresponding to the magnet accommodating portions $MHb_{10}$, $MHc_{10}$, $MHd_{10}$.

The end plate 20 is attached to the one end surface (lower surface) of the stacked body 10 so that the through hole $THa_{20}$ and the through hole $THa_{10}$ are coaxially arranged. The end plate 20 closes one end sides (lower sides) of the magnet accommodating portions $MHb_{10}$, $MHc_{10}$, $MHd_{10}$ in the extending direction. The other end sides (upper sides) of the magnet accommodating portions $MHb_{10}$, $MHc_{10}$, $MHd_{10}$ in the extending direction are open.

(Magnet Disposing Step)

Figure 6:
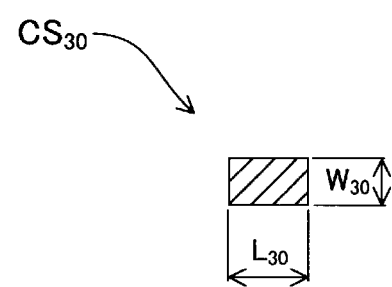
FIG. 6 is a cross-sectional view perpendicular to the longitudinal direction of a permanent magnet.

Then, the permanent magnets 30 are respectively inserted from the other end sides (upper sides) of the magnet containing portions $MHb_{10}$, $MHc_{10}$, $MHd_{10}$ in the extending direction, into the magnet accommodating portions $MHb_{10}$, $MHc_{10}$, $MHd_{10}$. The permanent magnet 30 has the shape of a prism. The length of the permanent magnet 30 is slightly smaller than the depth of the magnet accommodating portions $MHb_{10}$, $MHc_{10}$, $MHd_{10}$. As shown in FIG. 6, the cross section $CS_{30}$ perpendicular to the longitudinal direction of the permanent magnet 30 has a rectangular shape. The length $L_{30}$ of the cross section $CS_{30}$ is smaller than the length Lb of the cross section $CS_b$ (see FIG. 5). Further, the width $W_{20}$ of the cross section $CS_{30}$ is smaller than the width $W_b$ of the cross section $CS_b$ (see FIG. 5).

Figure 7:
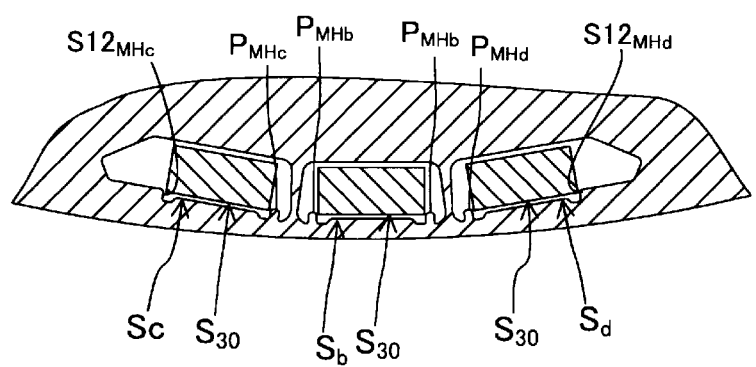
FIG. 7 is an enlarged view of an outer peripheral edge portion of a cross section perpendicular to the central axis of the rotor core.

In the magnet accommodating portion $MHb_{10}$, the permanent magnet 30 is disposed in the central portion of the magnet accommodating portion $MHb_{10}$ (see FIG. 7). That is, the central axis of each magnet accommodating portion $MHb_{10}$ coincides with the central axis of the permanent magnet 30. The permanent magnet 30 is positioned between the protrusions $P_{MHb}$, $P_{MHb}$. In the magnet accommodating portion $MHb_{10}$, the permanent magnet 30 is disposed such that the extending direction of the short sides of the cross section $S_{30}$ of the permanent magnet 30 coincides with the radial direction of the stacked body 10. As described above, the outer dimensions of the permanent magnet 30 are smaller than the inner dimensions of the magnet accommodating portion $MHb_{10}$ (see FIGS. 5 and 6). Therefore, a gap is formed between the outer peripheral surface of the permanent magnet 30 and the inner peripheral surface of the magnet accommodating portion $MHb_{10}$.

In the magnet accommodating portions $MHc_{10}$, $MHd_{10}$, the permanent magnets 30 are disposed toward the magnet accommodating portion $MHb_{10}$ side with respect to the central portions of the magnet accommodating portions $MHc_{10}$, $MHd_{10}$ (see FIG. 7). That is, in the magnet accommodating portion $MHc_{10}$, the permanent magnet 30 is disposed between the protrusion $P_{MHc}$ and the wall surface $S12_{MHc}$. In the magnet accommodating portion $MHd_{10}$, the permanent magnet 30 is disposed between the protrusion $P_MHd$ and the wall surface $S12_{MHd}$. In the magnet accommodating portions $MHc_{10}$, $MHd_{10}$, the permanent magnets 30 are disposed such that the extending directions of the short sides of the cross sections $S_{30}$, $S_{30}$ of the permanent magnets 30, 30 coincide with the radial direction of the stacked body 10. A gap is formed between the outer peripheral surface of the permanent magnet 30 and the inner peripheral surface of each of the magnet accommodating portions $MHc_{10}$, $MHd_{10}$.

(Second End Plate Attachment Step)

Figure 2:
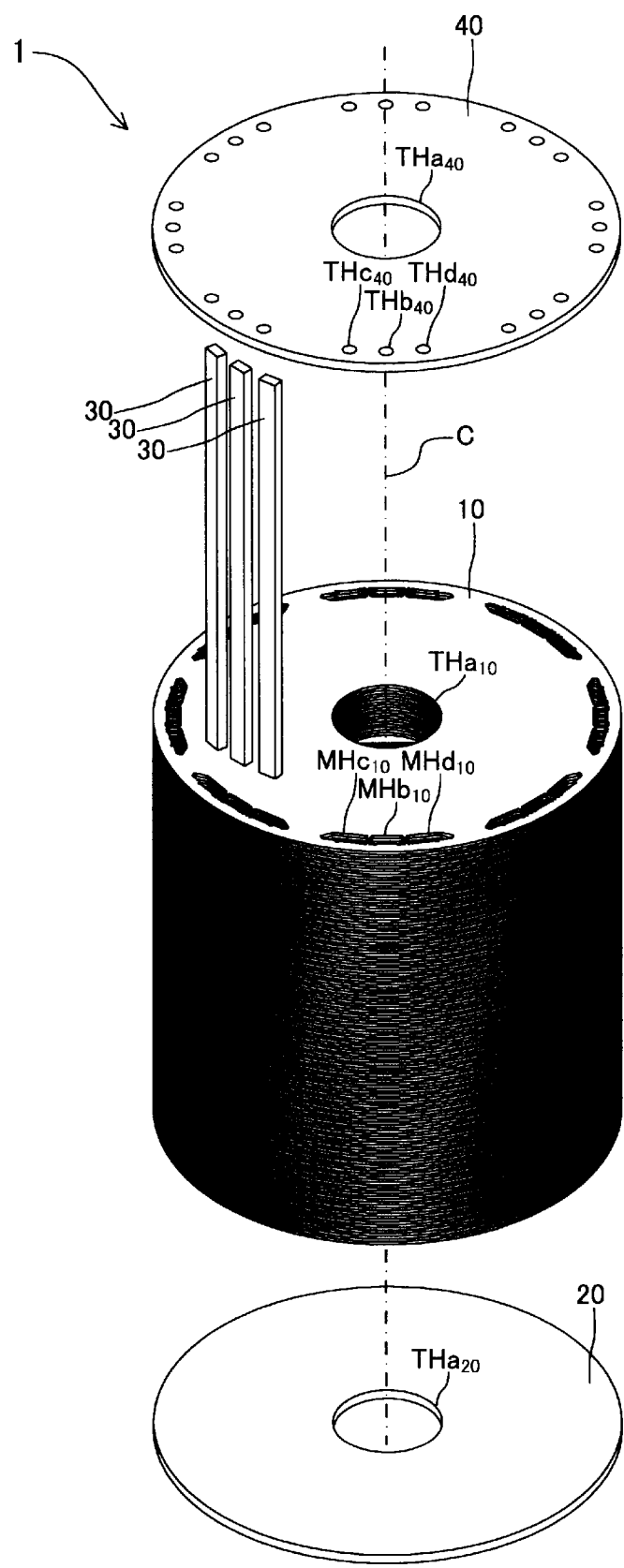
FIG. 2 is an exploded perspective view of the rotor core shown in FIG. 1.

Next, the end plate 40 is attached to the other end surface of the stacked body 10 in the extending direction of the central axis C (see FIG. 2). The end plate 40 is made from synthetic resin. The end plate 40 is a plate-shaped member having substantially the same shape as the iron core piece 11. The plate thickness of the end plate 40 is slightly larger than the plate thickness of the iron core piece 11. The end plate 40 has a circular through hole $THa_{40}$ having substantially the same diameter as the through hole $THa_{10}$ of the stacked body 10. The end plate 40 has a plurality of circular through holes $THb_{40}$, $THc_{40}$, $THd_{40}$, corresponding to the magnet accommodating portions $MHb_{10}$, $MHc_{10}$, $MHd_{10}$, respectively. The through holes $THb_{40}$, $THc_{40}$, $THd_{40}$ are tapered. That is, the inner diameters of the through holes $THb_{40}$, $THc_{40}$, $THd_{40}$ gradually decrease from one side surface of the end plate 40 toward the other side surface.

Figure 8:
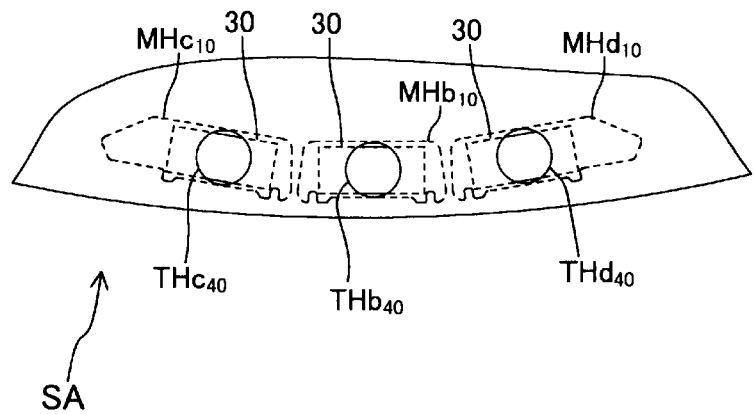
FIG. 8 is an enlarged view of the outer peripheral edge portion of an end face of an intermediate assembly in the extending direction of the central axis, which is the end face on the opening end side of the magnet accommodating portions.

The end plate 40 is disposed so that the through hole $THa_{40}$ and the through hole $THa_{10}$ are coaxially arranged and the central axes of the permanent magnets 30 and the central axes of the plurality of through holes $THb_{40}$, $THc_{40}$, $THd_{40}$ are coaxially arranged (see FIG. 8). The other side surface of the end plate 40 is in contact with the end surface of the stacked body 10. Thus, an intermediate assembly SA (see FIG. 9) is formed. In the intermediate assembly SA, the through hole $THa_{20}$, the through hole $THa_{10}$, and the through hole $THa_{40}$ communicate with each other in the extending direction of the central axis C. Further, the magnet accommodating portions $MHb_{10}$, $MHc_{10}$, $MHd_{10}$ and the through holes $THb_{40}$, $THc_{40}$, $THd_{40}$ communicate with each other in the direction parallel to the extending direction of the central axis C. One end sides (lower sides) of the magnet accommodating portions $MHb_{10}$, $MHc_{10}$, $MHd_{10}$ in the extending direction (depth direction) are closed, but the other end sides (upper sides) are open.

Next, a step of fixing (sealing) the permanent magnet 30 in each of the magnet accommodating portions $MHb_{10}$, $MHc_{10}$, $MHd_{10}$ will be described. First, the intermediate assembly SA is placed on a rotary table (not shown). The intermediate assembly SA and the rotary table are coaxially arranged. The end plate 40 is located on the upper side of the stacked body 10 and the end plate 20 is located on the lower side of the stacked body 10 (see the figure on the left side in FIG. 9). Next, using a heating device (not shown), the intermediate assembly SA (stacked body 10) is heated such that the temperature of the stacked body 10 is higher than a first temperature T1 described later (for example, 80° C.) and lower than a second temperature T2 (for example, 120° C.).

In order to fix (seal) the permanent magnet 30 in each of the magnet accommodating portions $MHb_{10}$, $MHc_{10}$, $MHd_{10}$, in the present embodiment, synthetic resin material Y as described in Japanese Unexamined Patent Application Publication No. 2000-239642 (JP 2000-239642 A) is used, for example. That is, the synthetic resin material Y is in a solid state (flakes) before use (at normal temperature), and the synthetic resin material Y in this state is heated. When the temperature of the synthetic resin material Y reaches the first temperature T1, the synthetic resin material Y softens. The synthetic resin material Y is not cured when it is maintained at the first temperature, but is cured when the temperature thereof reaches the second temperature T2, which is higher than the first temperature T1.

Figure 9:
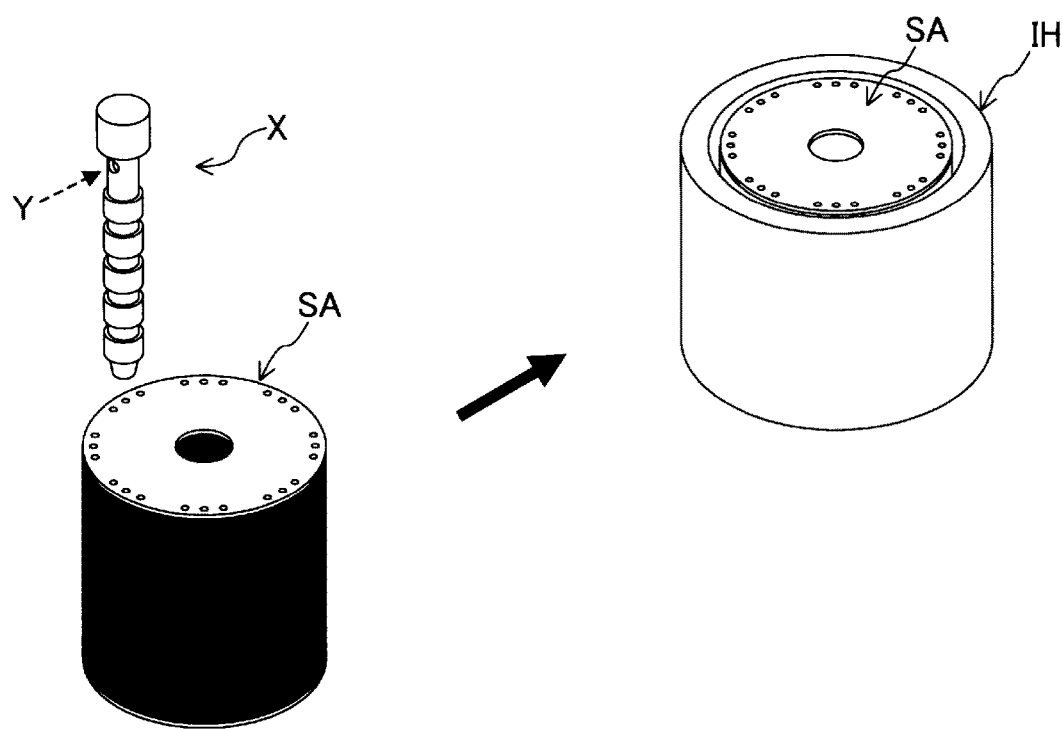
FIG. 9 is a perspective view showing an outline of an injection step and a curing step.
Figure 10:
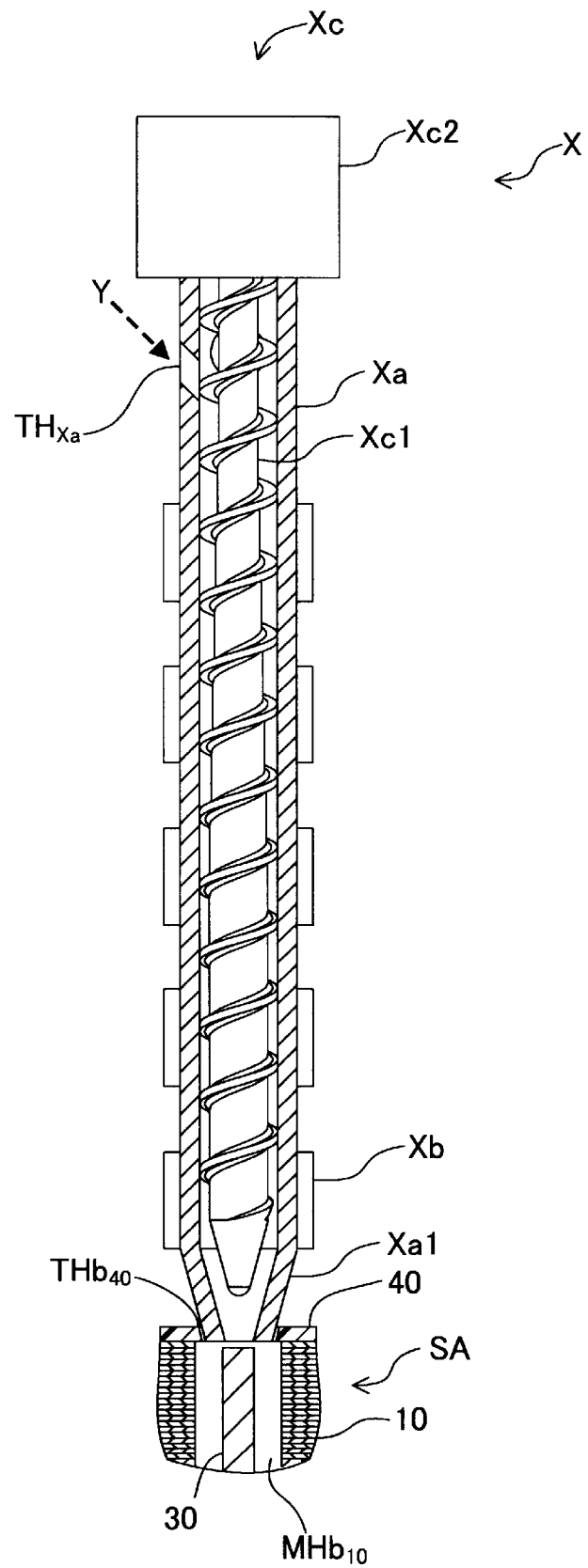
FIG. 10 is a cross-sectional view of an injection device and the intermediate assembly along the central axis of a nozzle in the injection step.

The synthetic resin material Y as described above is charged into the magnet accommodating portions $MHb_{10}$, $MHc_{10}$, $MHd_{10}$ using an injection device X. As shown in FIGS. 9 and 10, the injection device X includes a cylinder Xa, a heating device Xb, a delivery device Xc, and the like. The cylinder Xa has a tubular shape, and a nozzle Xa1 is provided at the tip end portion of the cylinder Xa. The outer diameter of the tip end portion of the nozzle Xa1 is slightly smaller than the inner diameter of each of the through holes $THb_{40}$, $THc_{40}$, $THd_{40}$. A through hole $TH_{Xa}$ is provided on a side surface portion of the cylinder Xa, and unused (flake-shaped) synthetic resin material Y is put into the cylinder Xa through the through hole $TH_{Xa}$. The heating device Xb is attached to the side surface portion of the cylinder Xa, and sets the temperature of the synthetic resin material Y in the cylinder Xa to the first temperature T1 to maintain the synthetic resin material Y in a softened state. The delivery device Xc includes a screw Xc1, a drive device Xc2, and the like. The screw Xc1 is accommodated in the cylinder Xa. The screw Xc1 and the cylinder Xa are coaxially arranged. One end portion of the screw Xc1 in the longitudinal direction (end portion on the nozzle Xa1 side) is formed in a sharp shape. The other end portion of the screw Xc1 in the longitudinal direction is connected to the drive device Xc2. The drive device Xc2 includes an electric motor and a speed reducer. The drive device Xc2 rotates the screw Xc1 around the central axis thereof.

(Injection Step)

First, the injection device X is disposed above the intermediate assembly SA such that the central axis of the nozzle Xa1 and the central axis of the through hole $THb_{40}$ coincide with each other. The injection device X is supported by an actuator (robot arm), which is not shown, and is moved in the up-down direction by this actuator.

Next, as shown in FIG. 10, the injection device X is lowered, the tip end portion of the nozzle Xa1 is inserted into the through hole $THb_{40}$, and the tip end surface of the nozzle Xa1 is brought into contact with the upper end surface of the stacked body 10. Next, the control device of the injection device X drives the drive device Xc2 to rotate the screw Xc1 in the normal direction, and the softened synthetic resin material Y is delivered through the nozzle Xa1. As a result, the space (gap) between the outer peripheral surface of the permanent magnet 30 and the inner peripheral surface of the magnet accommodating portion $MHb_{10}$ is filled with the synthetic resin material Y In the above-described charging step of the synthetic resin material Y, the control device of the injection device X monitors the injection pressure of the synthetic resin material Y. When the space (gap) in the magnet accommodating portion $MHb_{10}$ is filled with the synthetic resin material Y, the injection pressure rises sharply. When the control device detects that the injection pressure has sharply risen, the control device stops the drive device Xc2. Thus, the injection amount of the synthetic resin material Y to the magnet accommodating portion $MHb_{10}$ becomes substantially equal to the volume of the gap in the magnet accommodating portion $MHb_{10}$. By heating the stacked body 10 as described above, in the injection step, the temperature of the stacked body 10 is higher than the melting temperature of the synthetic resin material Y, so the synthetic resin material Y can be maintained in a molten state. Further, since the temperature of the stacked body 10 is lower than the curing temperature of the synthetic resin material Y, curing of the synthetic resin material Y can be suppressed. That is, in the injection step, the synthetic resin material can be maintained in a good state of fluidity.

Next, the control device drives the drive device Xc2 to rotate the screw Xc1 slightly in the reverse direction. Then, the injection device X is raised and separated from the intermediate assembly SA (see FIG. 11). By thus slightly rotating the screw Xc1 in the reverse direction, it is possible to restrain the synthetic resin material Y from dripping from the nozzle Xa1 when the injection device X is raised.

Next, the rotary table is rotated by a predetermined angle so that the injection device X is disposed above the magnet accommodating portion $MHc_{10}$. Then, the magnet accommodating portion $MHc_{10}$ is filled with the synthetic resin material Y in the same procedure as the procedure for filling the magnet accommodating portion $MHb_{10}$ with the synthetic resin material Y. The above steps are repeatedly executed, so that the other magnet accommodating portions $MHb_{10}$, $MHc_{10}$, $MHd_{10}$ are filled with the synthetic resin material Y.

(Curing Step)

When all the magnet accommodating portions $MHb_{10}$, $MHc_{10}$, $MHd_{10}$ are filled with the synthetic resin material Y, the injection device X is moved away (raised) from the intermediate assembly SA. Then, the intermediate assembly SA is transferred to an electromagnetic induction heater IH, and the outer peripheral surface of the intermediate assembly SA is heated with the electromagnetic induction heater IH (see the figure on the right side in FIG. 9). As a result, the temperature of the synthetic resin material Y in all the magnet accommodating portions $MHb_{10}$, $MHc_{10}$, $MHd_{10}$ reaches the second temperature T2, and the synthetic resin material Y is cured. Thus, the permanent magnet 30 is fixed (sealed) in each of the magnet accommodating portions $MHb_{10}$, $MHc_{10}$, $MHd_{10}$.

As described above, the synthetic resin material Y does not cure when the temperature thereof is maintained at the first temperature T1. In the present embodiment, in the step of filling the magnet accommodating portions $MHb_{10}$, $MHc_{10}$, $MHd_{10}$ with the synthetic resin material Y, the temperature of the stacked body 10 is set to be the same as the first temperature T1. Therefore, even when the synthetic resin material Y in this state is injected into the magnet accommodating portions $MHb_{10}$, $MHc_{10}$, $MHd_{10}$, the synthetic resin material Y in the magnet accommodating portions $MHb_{10}$, $MHc_{10}$, $MHd_{10}$ remains softened. Thus, unlike the cases where the manufacturing methods for a motor core of Patent Documents 1 to 3 are used, the injection pressure of the synthetic resin material Y can be set to be relatively low. Further, it is not necessary to maintain the pressure to restrain the backflow of the synthetic resin material Y. Therefore, it is possible to release the injection device X immediately after filling all the magnet accommodating portions $MHb_{10}$, $MHc_{10}$, $MHd_{10}$ with the synthetic resin material Y, transfer the intermediate assembly SA to another place (downstream side of the production line), and cure the synthetic resin material Y by heating at that location. That is, according to the present embodiment, when the filling of the synthetic resin material Y for one intermediate assembly SA is completed, it is possible to immediately release the injection device X without waiting for the completion of curing of the synthetic resin material Y and start the filling work of the synthetic resin material Y for the next intermediate assembly SA.

Further, the injection work of the synthetic resin material Y into each of the magnet accommodating portions $MHb_{10}$, $MHc_{10}$, $MHd_{10}$ is controlled based on the change in the injection pressure of the synthetic resin material Y. With this, the synthetic resin material Y in substantially the same amount (necessary and sufficient amount) as the volume of the space (gap) in each magnet accommodating portion $MHb_{10}$, $MHc_{10}$, $MHd_{10}$ is injected from the injection device X into each magnet accommodating portion $MHb_{10}$, $MHc_{10}$, $MHd_{10}$. After all the magnet accommodating portions $MHb_{10}$, $MHc_{10}$, $MHd_{10}$ are filled with the synthetic resin material Y, the intermediate assembly SA is heated by the electromagnetic induction heater IH so that the synthetic resin material Y is cured. In the curing step, the injection device X is released (moved away) from the intermediate assembly SA. Therefore, the heat of the intermediate assembly SA heated by the electromagnetic induction heater IH is not transferred to the injection device X. Thus, unlike the cases where the manufacturing methods of Patent Documents 2 and 3 are used, a situation where the synthetic resin material Y is cured does not occur in the injection device X. Accordingly, the work of removing the synthetic resin material Y from the injection device X is unnecessary.

As described above, according to the present embodiment, the efficiency in production of the rotor core 1 can be improved.

Furthermore, implementation of the present disclosure is not limited to the above-described embodiment, and various modifications can be made within the scope of the object of the present disclosure.

Figure 11A:
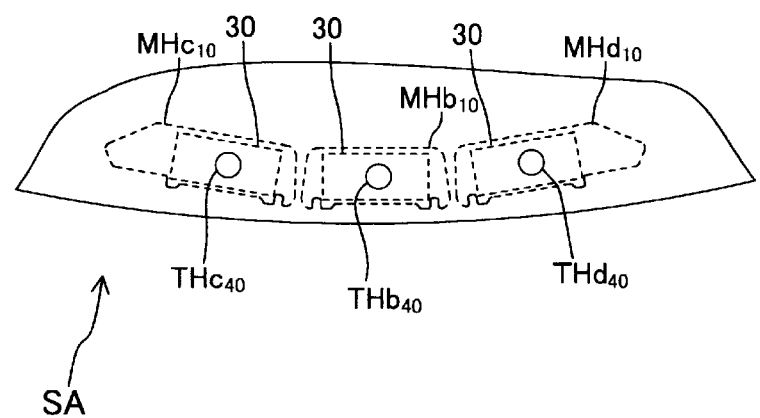
FIG. 11A is an enlarged plan view of the outer peripheral edge portion of an upper end plate in the injection step according to a first modification of the present disclosure.
Figure 11B:
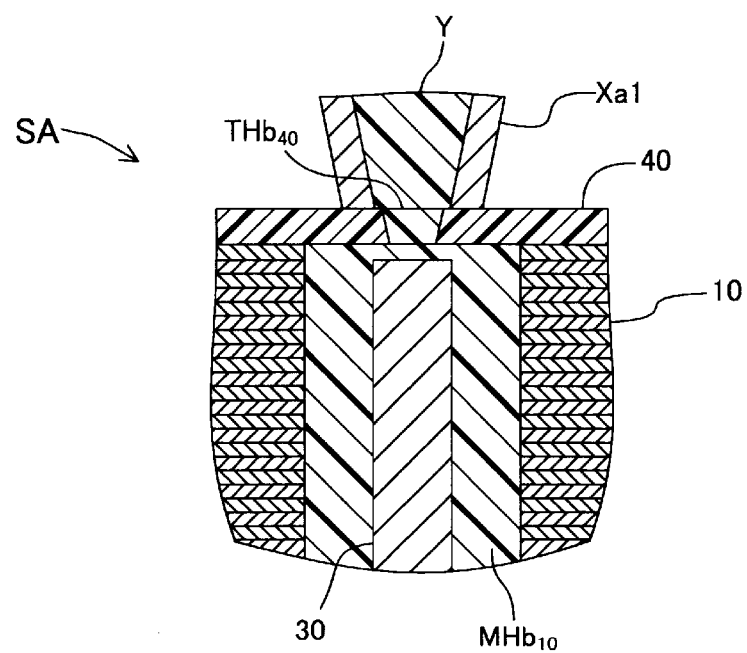
FIG. 11B is a cross-sectional view of the injection device and the intermediate assembly along the central axis of the nozzle in the injection step according to the first modification.
Figure 12:
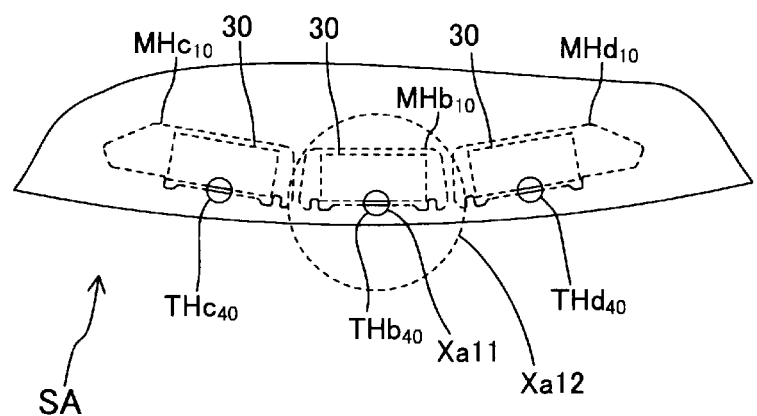
FIG. 12 is an enlarged plan view of the outer peripheral edge portion of the upper end plate in the injection step according to a second modification of the present disclosure.
Figure 13:
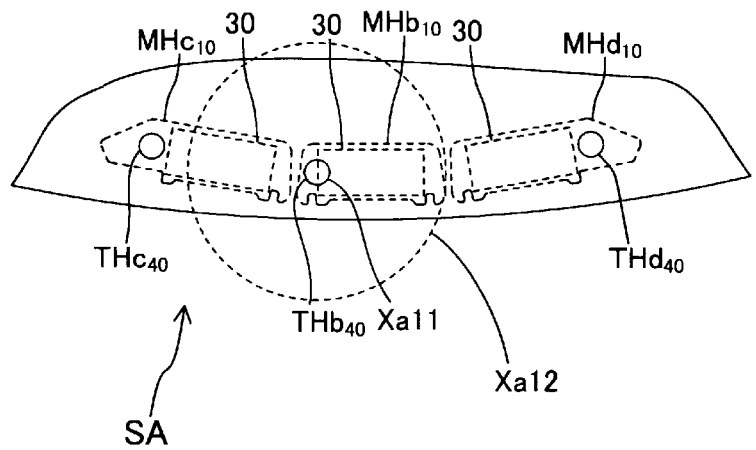
FIG. 13 is an enlarged plan view of the outer peripheral edge portion of the upper end plate in the injection step according to a third modification of the present disclosure.

For example, as shown in FIG. 11A, the inner diameters of the through holes $THb_{40}$, $THc_{40}$, $THd_{40}$ may be smaller than the outer diameter of the tip end portion of the nozzle Xa1. In this case, as shown in FIG. 11B, the nozzle Xa1 is pressed against the end plate 40 so that the tip end surface of the nozzle Xa1 is in close contact with the upper surface of the end plate 40. Further, as shown in FIG. 12, the central axis of each through hole $THb_{40}$, $THc_{40}$, $THd_{40}$ may be offset to the outer peripheral side of the stacked body 10 with respect to the center of the permanent magnet 30. Further, as shown in FIG. 13, the central axis of each through hole $THb_{40}$, $THc_{40}$, $THd_{40}$ may be offset in the circumferential direction of the stacked body 10 with respect to the center of the permanent magnet 30. That is, the discharge port of the nozzle Xa1 may be located above the space (gap) in each magnet accommodating portion $MHb_{10}$, $MHc_{10}$, $MHd_{10}$, rather than located above the permanent magnet 30. In the examples shown in FIGS. 12 to 13, the inner diameters of the through holes $THb_{40}$, $THc_{40}$, $THd_{40}$ may be set to be slightly larger than the outer diameter of the tip end portion of the nozzle Xa1 so that the tip end portion of the nozzle Xa1 can be inserted into the through holes $THb_{40}$, $THc_{40}$, $THd_{40}$.

Figure 14:
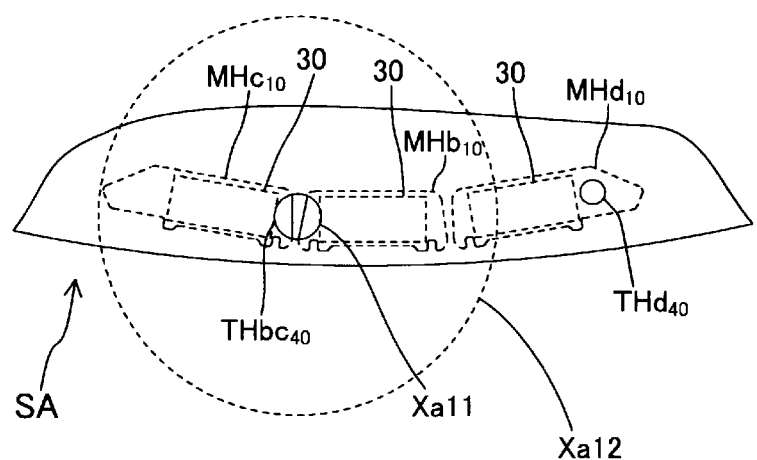
FIG. 14 is an enlarged plan view of the outer peripheral edge portion of the upper end plate in the injection step according to a fourth modification of the present disclosure.
Figure 15:
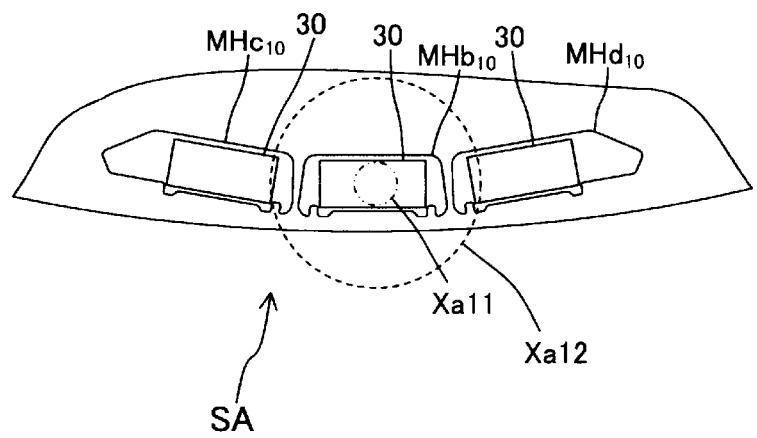
FIG. 15 is a plan view showing a positional relationship between the magnet accommodating portions and the nozzle in the injection step according to a fifth modification of the present disclosure.
Figure 16:
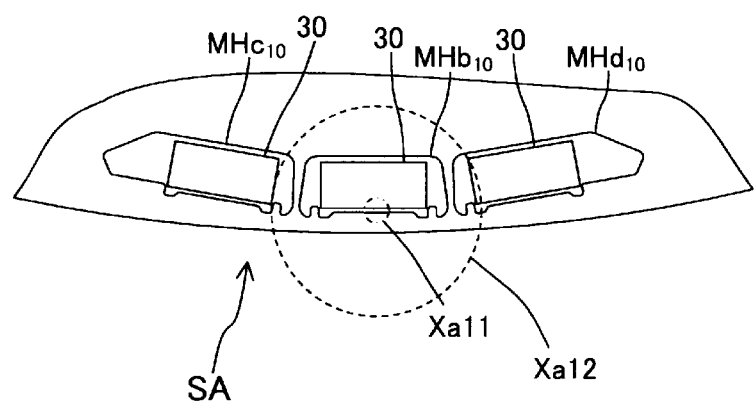
FIG. 16 is a plan view showing a positional relationship between the magnet accommodating portions and the nozzle in the injection step according to a sixth modification of the present disclosure.
Figure 17:
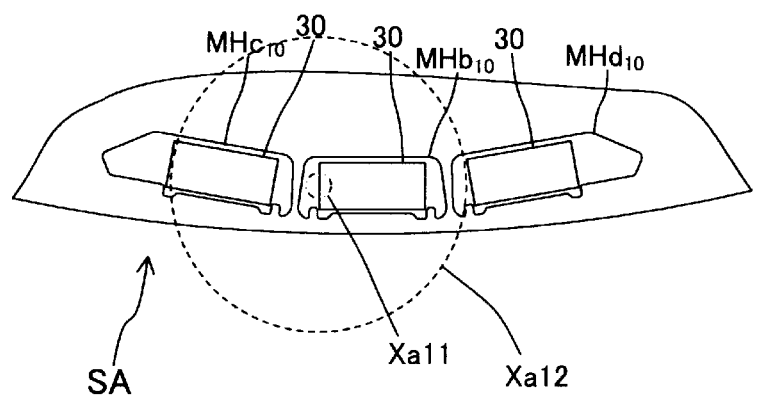
FIG. 17 is a plan view showing a positional relationship between the magnet accommodating portions and the nozzle in the injection step according to a seventh modification of the present disclosure.
Figure 18:
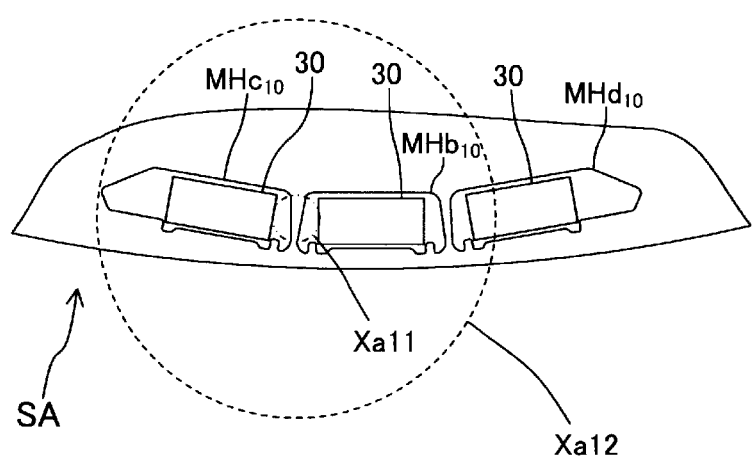
FIG. 18 is a plan view showing a positional relationship between the magnet accommodating portions and the nozzle in the injection step according to an eighth modification of the present disclosure.

Further, as shown in FIG. 14, the end plate 40 may have a through hole $THbc_{40}$ disposed at a boundary portion between the magnet accommodating portion $MHb_{10}$ and the magnet accommodating portion $MHc_{10}$. In this case, the synthetic resin material Y is simultaneously injected from the nozzle Xa1 into the two magnet accommodating portions $MHb_{10}$, $MHc_{10}$. In the examples shown in FIG. 14, the inner diameter of the through hole $THbc_{40}$ may be set slightly larger than the outer diameter of the tip end portion of the nozzle Xa1 so that the tip end portion of the nozzle Xa1 can be inserted into the through hole $THbc_{40}$.

Further, for example, the end plates 20, 40 may be abolished (see FIGS. 15 to 18). That is, the tip end surface of the nozzle Xa1 may be brought into contact with the end surface of the stacked body 10, and the synthetic resin material Y may be charged in the magnet accommodating portions $MHb_{10}$, $MHc_{10}$, $MHd_{10}$. In this case, it is preferable that the open ends of the magnet accommodating portions $MHb_{10}$, $MHc_{10}$, $MHd_{10}$ into which the synthetic resin material Y is to be injected be all covered by the tip end surface of the nozzle Xa1. In these cases, the opening portions of the magnet accommodating portions $MHb_{10}$, $MHc_{10}$, $MHd_{10}$ on the opposite side from the surface with which the nozzle Xa1 is brought into contact are closed with a jig. Similar to the examples shown in FIGS. 11A and 11B, the central axis of the nozzle Xa1 may be located above the center of the permanent magnet 30 (see FIG. 15). In FIGS. 15 to 18, the position of the nozzle Xa is shown by a dotted line as a double circle. The inner circle indicates a discharge hole Xa11 (a hole for discharging the synthetic resin material Y) at the tip end portion of the nozzle Xa1. The outer circle indicates the outer shape Xa12 of the tip end surface of the nozzle Xa. Further, as in the example shown in FIG. 12, the central axis of the nozzle Xa1 may be offset to the outer peripheral side of the stacked body 10 with respect to the center of the permanent magnet 30 (see FIG. 16). Further, as in the example shown in FIG. 13, the central axis of the nozzle Xa1 may be offset in the circumferential direction of the stacked body 10 with respect to the center of the permanent magnet 30 (see FIG. 17). Further, as in the example shown in FIG. 14, the central axis of the nozzle Xa1 may be located above the boundary portion between the magnet accommodating portion $MHb_{10}$ and the magnet accommodating portion $MHc_{10}$ (see FIG. 18).

The synthetic resin material Y may be simultaneously charged in the plurality of magnet accommodating portions $MHb_{10}$, $MHc_{10}$, $MHd_{10}$ with a plurality of injection devices X. Further, in the curing step, the intermediate assembly SA may be put into a heating furnace to heat and cure the synthetic resin material Y. Further, the above embodiment is an example in which the manufacturing method for a motor core according to the present disclosure is applied to the manufacture of the rotor core 1, but the present disclosure may be applied to the manufacture of the stator core.

Further, in the above embodiment, the end plates 20, 40 made from synthetic resin are adopted, but an end plate made of metal (for example, stainless steel, aluminum alloy, and the like) may be adopted.

In the above embodiment, the through holes $THb_{40}$, $THc_{40}$, $THd_{40}$ of the end plate 40 are tapered. That is, the inner diameters of the through holes $THb_{40}$, $THc_{40}$, $THd_{40}$ gradually decrease from one side surface of the end plate 40 toward the other side surface. Instead, the inner diameters of the through holes $THb_{40}$, $THc_{40}$, $THd_{40}$ may change in steps from one side surface of the end plate 40 toward the other side surface. Also, the inner diameters of the through holes $THb_{40}$, $THc_{40}$, $THd_{40}$ may be constant in the plate thickness direction of the end plate 40. Further, the shapes of the through holes $THb_{40}$, $THc_{40}$, $THd_{40}$ are not limited to the above-described embodiment, and may be, for example, elliptic or polygonal. In these cases, the shape of the nozzle Xa1 may be changed in accordance with the shapes of the through holes $THb_{40}$, $THc_{40}$, $THd_{40}$.

In the above embodiment, in the injection step, the tip end surface of the nozzle Xa1 is configured to close all the open ends of the holes into which the synthetic resin material Y is to be injected (through holes $THb_{40}$, $THc_{40}$, $THd_{40}$, magnet accommodating portions $MHb_{10}$, $MHc_{10}$, $MHd_{10}$). However, the tip end surface of the nozzle Xa1 may be configured to close part of the open ends. In this case, the outer shape Xa12 of the nozzle tip end surface may be changed in accordance with the shape of the hole into which the synthetic resin material Y is to be injected. Further, the shape and the position of the discharge hole Xa11 on the nozzle tip end surface may also be changed in accordance with the shape of the hole into which the synthetic resin material Y is to be injected. Further, at the tip end portion of the nozzle Xa, the flow path of the synthetic resin material Y may be branched so that the tip end portion has a plurality of discharge holes Xa11. Further, using the nozzle Xa having the plurality of discharge holes Xa11, the synthetic resin material Y may be injected into a plurality of holes (through holes $THb_{40}$, $THc_{40}$, $THd_{40}$, magnet accommodating portions $MHb_{10}$, $MHc_{10}$, $MHd_{10}$) at the same time.

In the injection step of the above embodiment (step of filling the magnet accommodating portions $MHb_{10}$, $MHc_{10}$, $MHd_{10}$ with the synthetic resin material Y), the injection amount of the synthetic resin material Y is controlled based on the change in the injection pressure of the synthetic resin material Y Instead of this, for example, the injection amount of the synthetic resin material Y may be controlled based on the rotation amount (the number of times of rotation) of the screw Xc1. Further, as the injection device X, a device that pressurizes and delivers the softened synthetic resin material Y may be adopted. In this case, the injection amount of the synthetic resin material Y may be controlled based on the pressurizing force.

In the curing step of the above embodiment, the outer peripheral surface of the intermediate assembly SA is heated. Instead of or in addition to this, the inner peripheral surface of the intermediate assembly SA, and one end surface or the other end surface of the intermediate assembly SA in the central axis direction may be heated.

DESCRIPTION OF REFERENCE NUMERALS $MHb_{10}$, $MHc_{10}$, $MHd_{10}$ . . . magnet accommodating portion, T1 . . . first temperature, T2 . . . second temperature, X . . . injection device, Y . . . synthetic resin material, 1 . . . rotor core, 10 . . . stacked body, 11 . . . iron core piece, 20, 40 . . . end plate, 30 . . . permanent magnet

The invention claimed is:

1. A manufacturing method for a motor core, the manufacturing method comprising:
    a stacked body manufacturing step of stacking a plurality of steel plates to manufacture a stacked body having a magnet accommodating portion extending in a stacking direction of the steel plates;
    a magnet disposing step of disposing a permanent magnet extending in the stacking direction of the plurality of steel plates in the magnet accommodating portion; and
    a fixing step of fixing the permanent magnet in the magnet accommodating portion using a synthetic resin material that is in a softened state at a first temperature and is cured at a second temperature that is higher than the first temperature, wherein
    the fixing step includes:
    an injection step of raising a temperature of the synthetic resin material to the first temperature and injecting, with an injection device having a container capable of maintaining the synthetic resin material in the softened state, the softened synthetic resin material into the magnet accommodating portion; and
    a curing step of raising the temperature of the synthetic resin material injected into the stacked body to the second temperature to cure the synthetic resin material, with the injection device being moved away from the stacked body.

2. The manufacturing method for a motor core according to claim 1, wherein the injection device has a heating device and maintains the synthetic resin material at the first temperature.

3. The manufacturing method for a motor core according to claim 1, wherein:
    prior to the injection step, the stacked body is heated such that the temperature of the stacked body is higher than the first temperature and lower than the second temperature; and
    in the injection step, a nozzle of the injection device is brought into contact with an open end of the magnet accommodating portion of the stacked body, and the softened synthetic resin material is injected.

4. The manufacturing method for a motor core according to claim 1, wherein in the injection step, when an injection pressure of the synthetic resin material becomes higher than a predetermined pressure, injection of the synthetic resin material into a through hole of the stacked body is stopped.

5. The manufacturing method for a motor core according to claim 1, wherein:
the injection device includes a drive device for discharging the synthetic resin material from the container; and
in the injection step, after the magnet accommodating portion is filled with the softened synthetic resin material, a drive direction of the drive device of the injection device is reversed, and then the injection device is moved away from the stacked body.

6. The manufacturing method for a motor core according to claim 1, wherein the curing step includes a step of moving the injection device away from the stacked body, transferring the stacked body to a heating furnace or an induction heating device at a location different from the injection device, and raising the temperature of the synthetic resin material injected into the stacked body to the second temperature with the heating furnace or the induction heating device so as to cure the synthetic resin material.

7. A manufacturing method for a motor core, the manufacturing method comprising:
a stacked body manufacturing step of stacking a plurality of steel plates to manufacture a stacked body having a magnet accommodating portion extending in a stacking direction of the steel plates;
a magnet disposing step of disposing a permanent magnet extending in the stacking direction of the plurality of steel plates in the magnet accommodating portion; and
a fixing step of fixing the permanent magnet in the magnet accommodating portion using a synthetic resin material that is in a softened state at a first temperature and is cured at a second temperature that is higher than the first temperature, wherein
the fixing step includes:
an injection step of raising a temperature of the synthetic resin material to the first temperature and injecting, with an injection device having a container capable of maintaining the synthetic resin material in the softened state, the softened synthetic resin material into the magnet accommodating portion; and
a curing step of transferring the stacked body to a heating furnace or an induction heating device at a location different from the injection device and raising the temperature of the synthetic resin material injected into the stacked body to the second temperature with the heating furnace or the induction heating device so as to cure the synthetic resin material.

8. The manufacturing method for a motor core according to claim 7, wherein in the injection step, the stacked body is heated such that the temperature of the stacked body is higher than the first temperature and lower than the second temperature.

9. A manufacturing method for a motor core, the manufacturing method comprising:
a stacked body manufacturing step of stacking a plurality of steel plates to manufacture a stacked body having a magnet accommodating portion extending in a stacking direction of the steel plates;
a magnet disposing step of disposing a permanent magnet extending in the stacking direction of the plurality of steel plates in the magnet accommodating portion; and
a fixing step of fixing the permanent magnet in the magnet accommodating portion using a synthetic resin material that is in a solid state at a third temperature, is in a softened state at a first temperature that is higher than the third temperature, and is cured at a second temperature that is higher than the first temperature, wherein
the fixing step includes:
an injection step of raising a temperature of the synthetic resin material from the third temperature to the first temperature to soften the synthetic resin material and injecting the softened synthetic resin material into the magnet accommodating portion; and
a curing step of raising the temperature of the synthetic resin material injected into the stacked body to the second temperature to cure the synthetic resin material.

10. The manufacturing method for a motor core according to claim 9, wherein the injection step includes a step of charging the synthetic resin material in the solid state into the injection device, raising the temperature of the charged synthetic resin material to the first temperature to soften the synthetic resin material, and injecting the softened synthetic resin material into the magnet accommodating portion.

11. The manufacturing method for a motor core according to claim 9, wherein in the injection step, the stacked body is heated such that the temperature of the stacked body is higher than the first temperature and lower than the second temperature.

* * * * *